(12) United States Patent
Saucedo

(10) Patent No.: US 7,401,368 B1
(45) Date of Patent: Jul. 22, 2008

(54) TRACTOR BED SYSTEM

(76) Inventor: Alberto Saucedo, 18916 Bob O Link Dr., Miami, FL (US) 33015

( * ) Notice: Subject to any disclaimer, the term of this patent is extended or adjusted under 35 U.S.C. 154(b) by 177 days.

(21) Appl. No.: 11/396,014

(22) Filed: Apr. 3, 2006

(51) Int. Cl.
*B60P 3/38* (2006.01)
*A47C 19/00* (2006.01)

(52) U.S. Cl. .............................................. 5/118; 5/210

(58) Field of Classification Search ...................... 5/118, 5/239, 241, 244, 253, 210
See application file for complete search history.

(56) References Cited

U.S. PATENT DOCUMENTS

| | | | | |
|---|---|---|---|---|
| 3,299,447 A | * | 1/1967 | Dome | 5/118 |
| 3,371,359 A | * | 3/1968 | Dome | 5/118 |
| 3,760,436 A | | 9/1973 | Zach et al. | |
| 4,144,601 A | | 3/1979 | Anderson et al. | |
| 4,196,483 A | * | 4/1980 | Lefler et al. | 5/118 |
| 4,669,139 A | * | 6/1987 | Richter, Jr. | 5/118 |
| 4,713,851 A | | 12/1987 | Rosquist | |
| 4,868,939 A | | 9/1989 | Tagtow | |
| D317,230 S | | 6/1991 | McCain et al. | |
| 5,218,728 A | * | 6/1993 | Lloyd et al. | 5/118 |
| 6,631,526 B1 | * | 10/2003 | Enright | 5/118 |

* cited by examiner

*Primary Examiner*—Michael Trettel

(57) ABSTRACT

A tractor bed system for allowing a driver to sleep while another driver drives a tractor includes the present invention meets the needs presented above by generally comprising a base being coupled to a floor of a sleeper cab. A frame is attached to the base and is positioned in a spaced relationship above the base. The frame receives a mattress and is configured to support a person in a prone position when the person is sleeping. A plurality of shock absorbers is coupled between the base and the frame. Each of the shock absorbers absorbs shocks passing from the base to the frame to inhibit disturbing the person on the mattress when the tractor is traveling over a rough surface.

18 Claims, 5 Drawing Sheets

TRACTOR BED SYSTEM

BACKGROUND OF THE INVENTION

1. Field of the Invention

The present invention relates to bed suspension systems and more particularly pertains to a new bed suspension system for allowing a driver to sleep while another driver drives a tractor.

2. Description of the Prior Art

The use of bed suspension systems is known in the prior art which typically teaches the use of arms that are rigidly mounted to a frame a support surface to allow vertical movement to be transferred to the frame and thereby a mattress on the frame.

While these devices fulfill their respective, particular objectives and requirements, the need remains for a system that has certain improved features that allow for vertical shocks to be absorbed and reduced swaying of a bed to enhance the comfort of a driver sleeping in a tractor being driven along an uneven surface.

SUMMARY OF THE INVENTION

The present invention meets the needs presented above by generally comprising a base being coupled to a floor of a sleeper cab. A frame is attached to the base and is positioned in a spaced relationship above the base. The frame receives a mattress. The mattress is configured to support a person in a prone position when the person is sleeping. A plurality of shock absorbers is coupled between the base and the frame. Each of the shock absorbers absorbs shocks passing from the base to the frame to inhibit disturbing the person on the mattress when the tractor is traveling over a rough surface.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
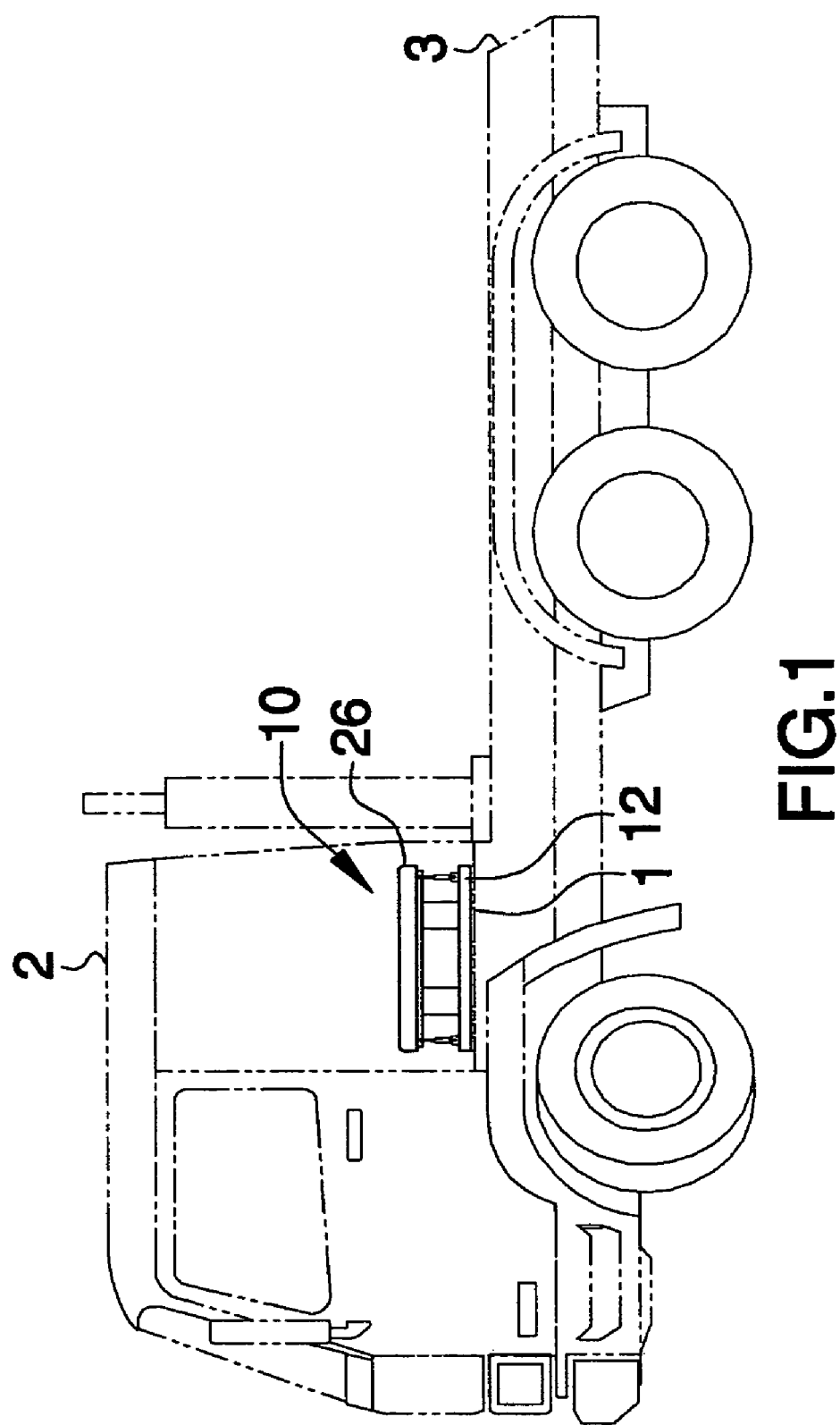
FIG. 1 is a side view of a tractor bed system according to the present invention shown in place in a tractor.
Figure 2:
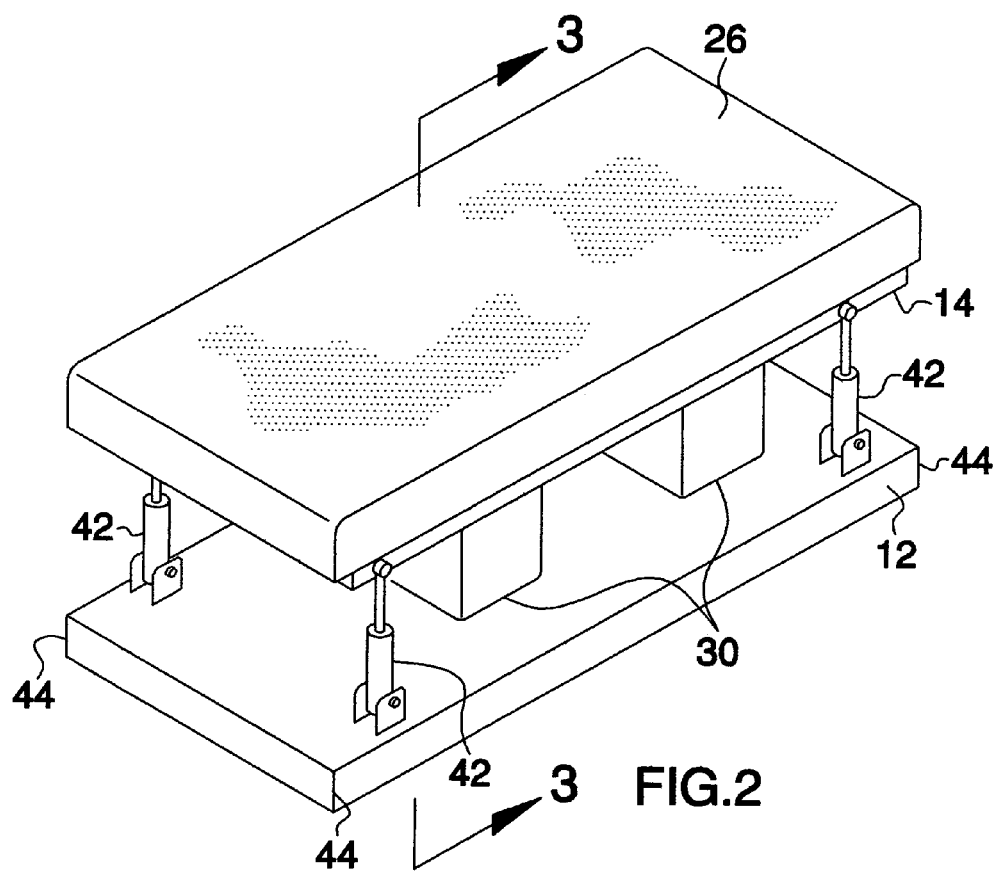
FIG. 2 is a perspective view of the present invention.
Figure 3:
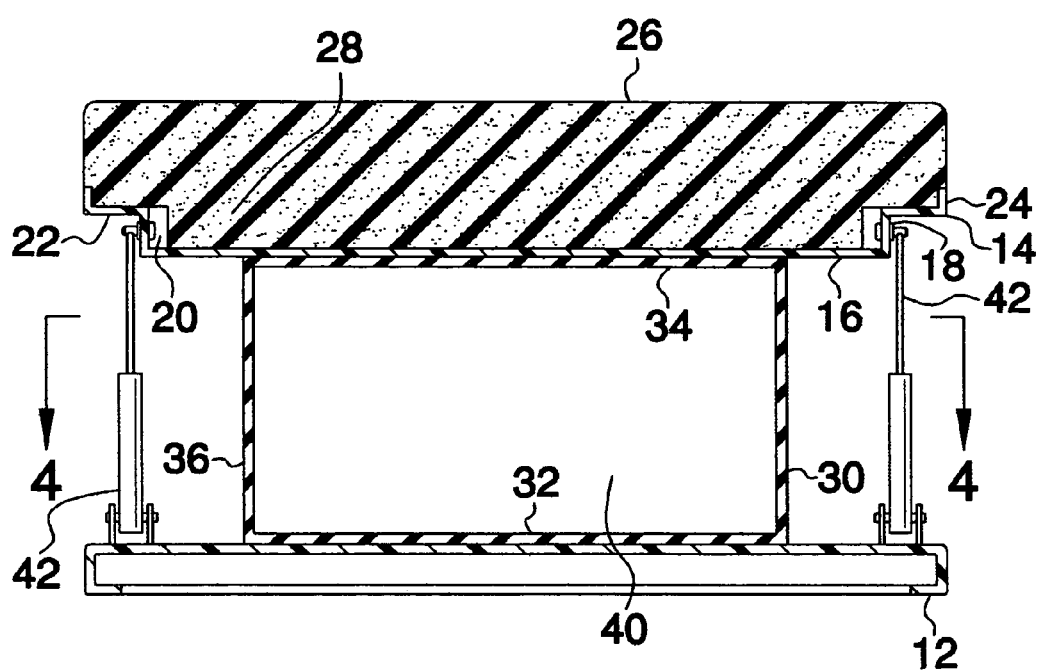
FIG. 3 is a cross-sectional view of the present invention taken along line 3-3 of FIG. 1.
Figure 4:
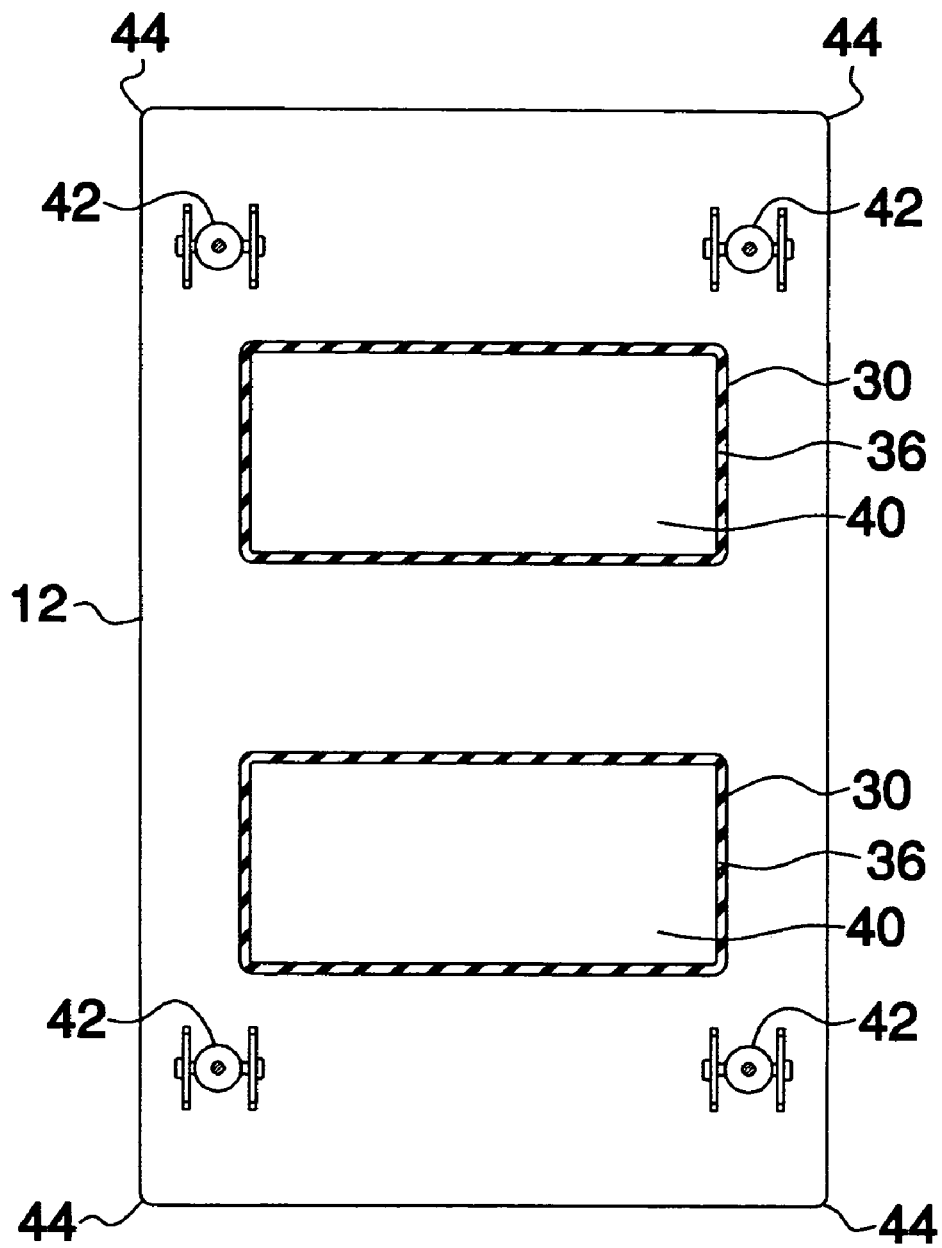
FIG. 4 is a cross-sectional view of the present invention taken along line 4-4 of FIG. 3.
Figure 5:
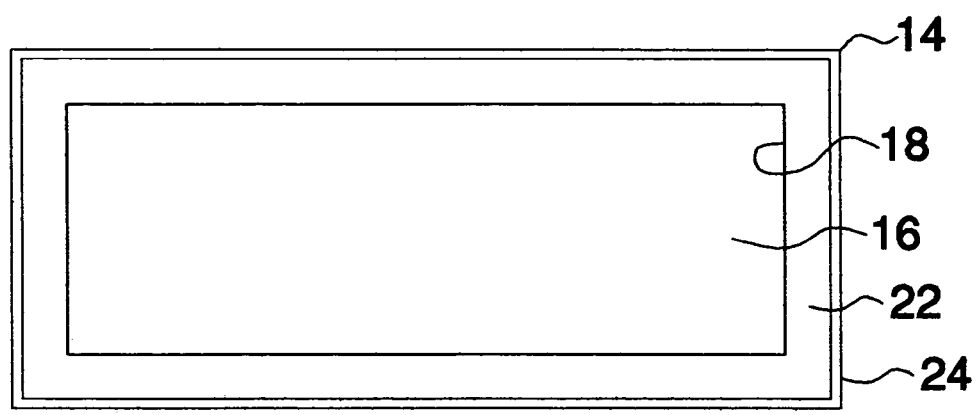
FIG. 5 is a top view of the frame of the present invention.

With reference now to the drawings, and in particular to FIGS. 1 through 5 thereof, a new bed suspension system embodying the principles and concepts of the present invention and generally designated by the reference numeral 10 will be described.

As best illustrated in FIGS. 1 through 5, the tractor 3 bed system 10 generally comprises a base 12 being coupled to a floor 1 of a sleeper cab 2 to inhibit sliding of the base 12 across the floor 1 when a tractor 3 is in motion. A frame 14 is attached to the base 12 and is positioned in a spaced relationship above the base 12. The frame 14 includes a lower wall 16 and a peripheral wall 18 attached to and extending upwardly from the lower wall 16 to define a recessed area 20 of the frame 14. A ledge wall 22 is coupled to the peripheral wall 18 distal the lower wall 16 and extending outwardly from the peripheral wall 18. A flange 24 is coupled to the ledge wall 22 and extends upwardly from the ledge wall 22. The flange 24 and the ledge wall 22 are coextensive with the peripheral wall 18. The frame 14 receives a mattress 26 that is configured to support a person in a prone position when the person is sleeping. A lower portion 28 of the mattress 26 has a shape configured for insertion into the recessed area 20 of the frame 14 to inhibit sliding of the mattress 26 with respect to the frame 14.

At least one air bag 30 is positioned between the frame 14 and the base 12. The air bag 30 absorbs shocks passing from the base 12 to the frame 14 to inhibit disturbing the person on the mattress 26 when the tractor 3 is traveling over a rough surface. The at least one air bag 30 includes a bottom wall 32, a top wall 34 and a perimeter wall 36 extending between the top wall 34 and the bottom wall 32 to define an interior space 40. The interior space 40 is filled with a gaseous material. The at least one air bag 30 is comprised of a resiliently flexible material to allow the at least one air bag 30 to flex to absorb the shock passing through the base 12.

A plurality of shock absorbers 42 is coupled between the base 12 and the frame 14. Each of the shock absorbers 42 absorbs shocks passing from the base 12 to the frame 14 to inhibit disturbing the person on the mattress 26 when the tractor 3 is traveling over a rough surface. Each of the shock absorbers 42 is pivotally coupled to the frame 14 and the base 12. Each of the shock absorbers 42 is pivotally coupled to the peripheral wall 18 and positioned under the ledge wall 22 of the frame 14 to inhibit the shock absorbers 42 extending horizontally beyond the flange 24 of the frame 14. This also allows for the shock absorbers 42 to compensate for lateral gravitational forces when the tractor 3 is turning or on a banked curve. Each of the shock absorbers 42 is positioned adjacent one of a plurality of corners 44 of the base 12.

In use, the base 12 is coupled to the floor 1 of the sleeper cab 2 with the frame 14 and mattress 26 coupled to the at least one air bag 30 and shock absorbers 42 and positioned above the base 12. One of the drivers lies on the mattress 26 and sleeps while the other one of the drivers drives the tractor 3.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tractor bed system for allowing one driver to sleep while another driver drives a tractor, said system comprising:
   a base being coupled to a floor of a sleeper cab;
   a frame being attached to said base and being positioned in a spaced relationship above said base;
   a mattress being received by said frame, said mattress being configured to support a person in a prone position when the person is sleeping;
   a plurality of shock absorbers being coupled between said base and said frame, each of said shock absorbers absorbing shocks passing from said base to said frame to inhibit disturbing the person on said mattress when the tractor is traveling over a rough surface;
   said frame including a lower wall and a peripheral wall being attached to and extending upwardly from said lower wall to define a recessed area of said frame; and
   said mattress has a lower portion having a shape configured to be inserted into said recessed area of said frame to inhibit sliding of said mattress with respect to said frame.

2. The system according to claim 1, wherein said frame includes a ledge wall being coupled to said peripheral wall distal said lower wall and extending outwardly from said peripheral wall, said ledge wall being coextensive with said peripheral wall.

3. The system according to claim 2, wherein said frame includes a flange being coupled to said ledge wall and extending upwardly from said ledge wall, said flange being coextensive with said ledge wall.

4. The system according to claim 2, wherein each of said shock absorbers are pivotally coupled to said peripheral wall and positioned under said ledge wall of said frame.

5. The system according to claim 1, further comprising at least one air bag is positioned between said frame and said base, said air bag absorbing shocks passing from said base to said frame to inhibit disturbing the person on said mattress when the tractor is traveling over a rough surface.

6. The system according to claim 5, wherein said at least one air bag includes a bottom wall, a top wall and a perimeter wall extending between said top wall and said bottom wall to define an interior space, said interior space being filled with a gaseous material.

7. The system according to claim 5, wherein said at least one air bag is comprised of a resiliently flexible material to allow said at least one air bag to flex to absorb the shock passing through said base.

8. The system according to claim 1, wherein each of said shock absorbers is pivotally coupled to said frame and said base.

9. The system according to claim 1, wherein each of said shock absorbers is positioned adjacent one of a plurality of corners of said base.

10. A tractor bed system for allowing one driver to sleep while another driver drives a tractor, said system comprising:
    a base being coupled to a floor of a sleeper cab;
    a frame being attached to said base and being positioned in a spaced relationship above said base, said frame comprising;
       a lower wait and a peripheral wall being attached to and extending upwardly from said lower wall to define a recessed area of said frame;
       a ledge wall being coupled to said peripheral wall distal said lower wall and extending outwardly from said peripheral wall, said ledge wall being coextensive with said peripheral wall;
       a flange being coupled to said ledge wall and extending upwardly from said ledge wall, said flange being coextensive with said ledge wall;
    a mattress being received by said frame, said mattress being configured to support a person in a prone position when the person is sleeping, a lower portion of said mattress having a shape configured to be inserted into said recessed area of said frame to inhibit sliding of said mattress with respect to said frame;
    at least one air bag being positioned between said frame and said base, said air bag absorbing shocks passing from said base to said frame to inhibit disturbing the person on said mattress when the tractor is traveling over a rough surface, said at least one air bag including a bottom wall, a top wall and a perimeter wall extending between said top wall and said bottom wall to define an interior space, said interior space being filled with a gaseous material, said at least one air bag being comprised of a resiliently flexible material to allow said at least one air bag to flex to absorb the shock passing through said base; and
    a plurality of shock absorbers being coupled between said base and said frame, each of said shock absorbers absorbing shocks passing from said base to said frame to inhibit disturbing the person on said mattress when the tractor is traveling over a rough surface, each of said shock absorbers being pivotally coupled to said frame and said base, each of said shock absorbers being pivotally coupled to said peripheral wall and positioned under said ledge wall of said frame, each of said shock absorbers being positioned adjacent one of a plurality of corners of said base.

11. A tractor bed system for allowing one driver to sleep while another driver drives a tractor, said system comprising:
    a base being coupled to a floor of a steeper cab;
    a frame being attached to said base and being positioned in a spaced relationship above said base;
    a mattress being received by said frame, said mattress being configured to support a person in a prone position when the person is sleeping;
    a plurality of shock absorbers being coupled between said base and said frame, each of said shock absorbers absorbing shocks passing from said base to said frame to inhibit disturbing the person on said mattress when the tractor is traveling over a rough surface;
    said frame including a lower wall and a peripheral wall being attached to and extending upwardly from said lower wall to define a recessed area of said frame; and
    said frame including a ledge wall being coupled to said peripheral wall distal said lower wall and extending outwardly from said peripheral wall, said ledge wall being coextensive with said peripheral wall.

12. The system according to claim 11, wherein said frame includes a flange being coupled to said ledge wall and extending upwardly from said ledge wall, said flange being coextensive with said ledge wall.

13. The system according to claim 11, wherein each of said shock absorbers are pivotally coupled to said peripheral wall and positioned under said ledge wall of said frame.

14. The system according to claim 11, further comprising at least one air bag is positioned between said frame and said base, said air bag absorbing shocks passing from said base to said frame to inhibit disturbing the person on said mattress when the tractor is traveling over a rough surface.

15. The system according to claim 14, wherein said at least one air bag includes a bottom wall, a top wall and a perimeter wall extending between said top wall and said bottom wall to define an interior space, said interior space being filled with a gaseous material.

16. The system according to claim 15, wherein said at least one air bag is comprised of a resiliently flexible material to allow said at least one air bag to flex to absorb the shock passing through said base.

17. The system according to claim 11, wherein each of said shock absorbers is pivotally coupled to said frame and said base.

18. The system according to claim 11, wherein each of said shock absorbers is positioned adjacent one of a plurality of corners of said base.

* * * * *